Jan. 5, 1965   G. NEIDL   3,164,330
ROTARY-PUMP APPARATUS
Filed Aug. 30, 1961   4 Sheets-Sheet 1
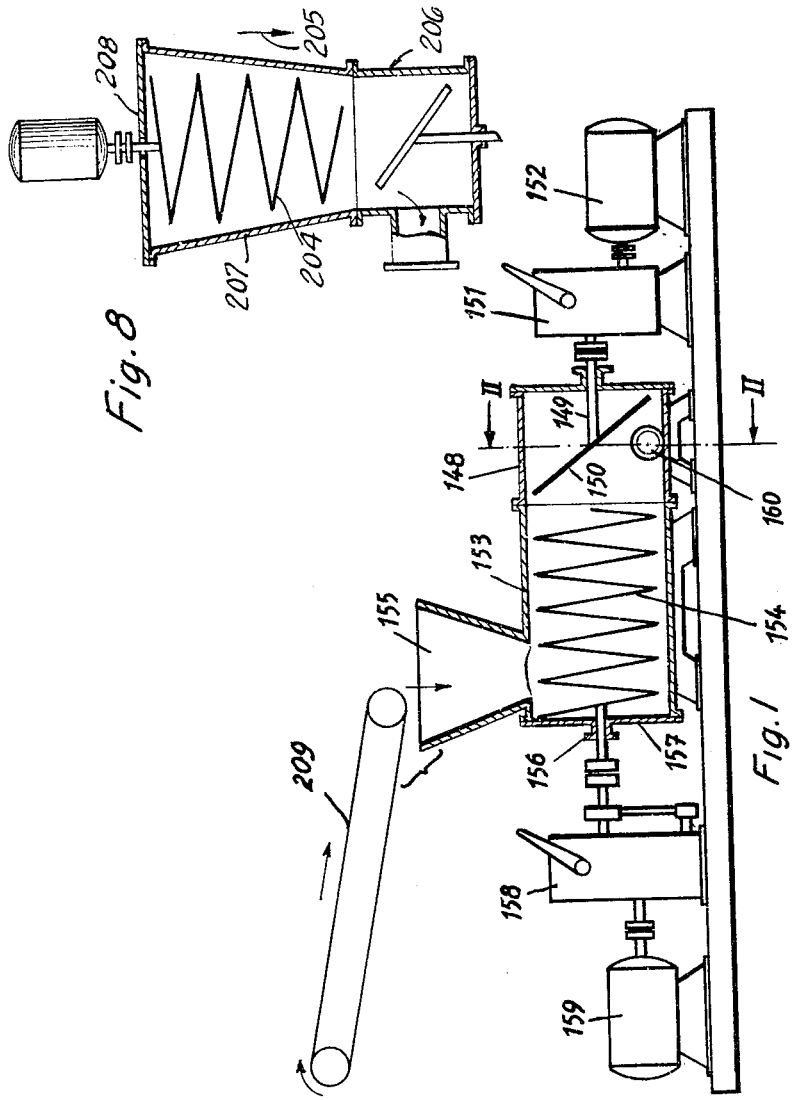
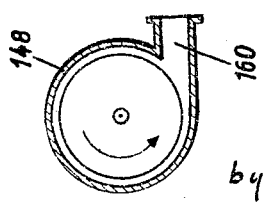
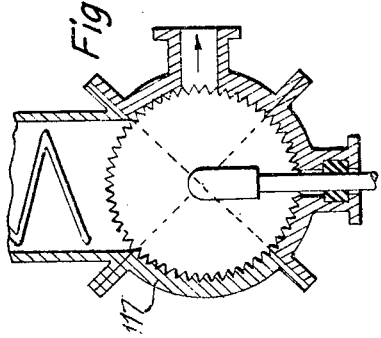
INVENTOR
Georg Neidl
by Mestern, Ross + Mestern

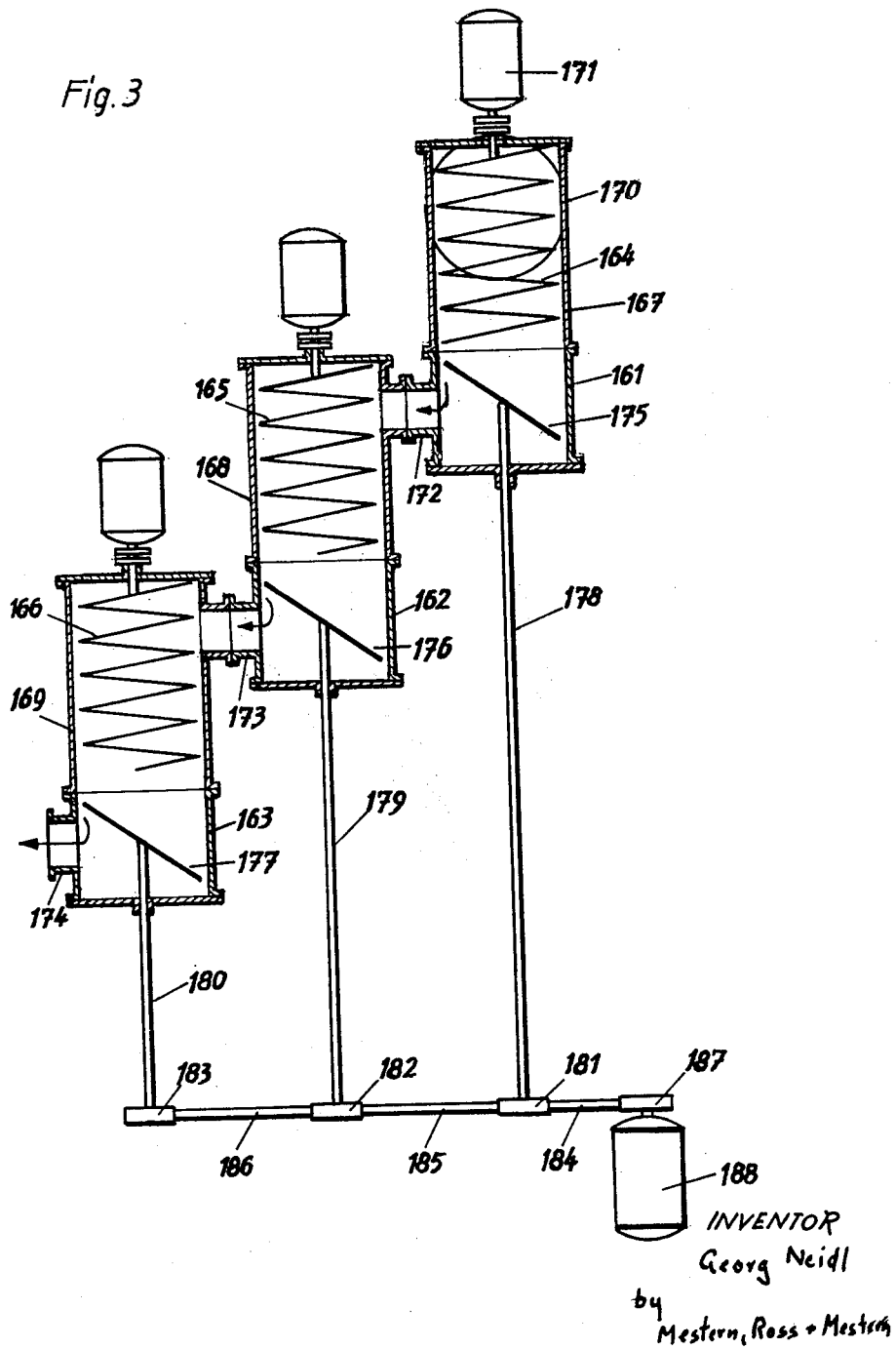

Jan. 5, 1965 G. NEIDL 3,164,330
ROTARY-PUMP APPARATUS
Filed Aug. 30, 1961 4 Sheets-Sheet 3
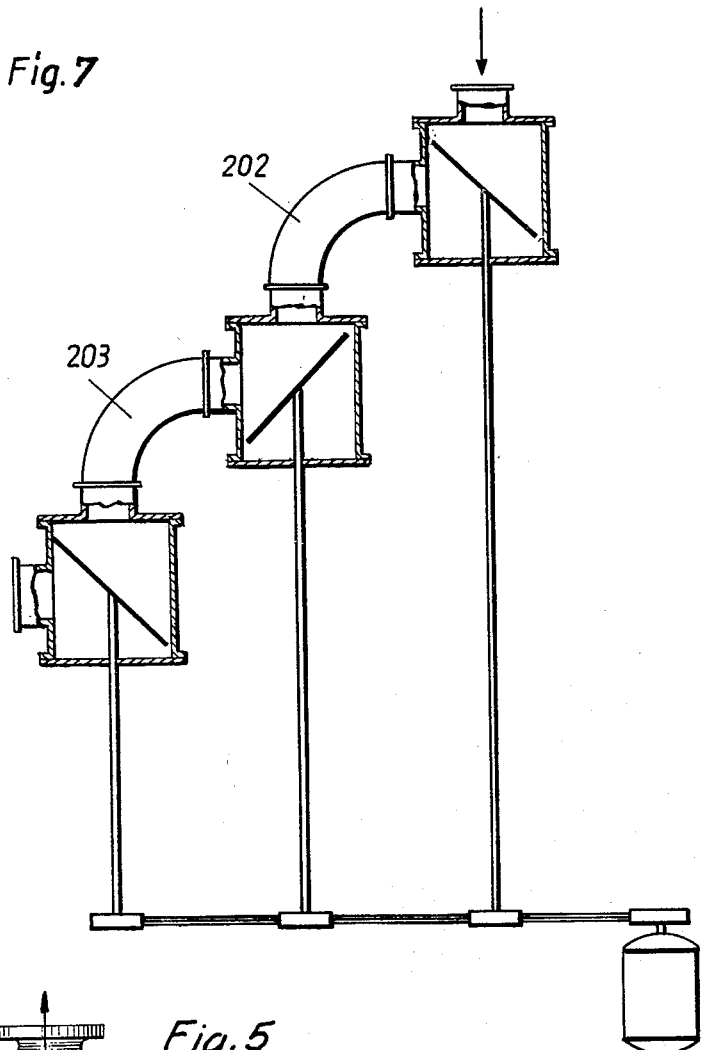
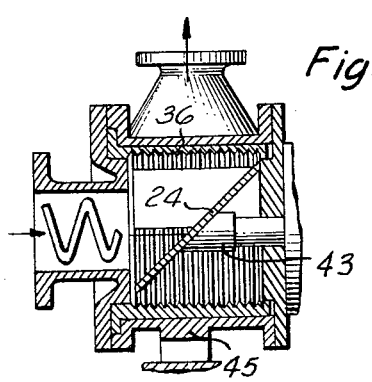
INVENTOR
Georg Neidl
by Mestern, Ross + Mestern

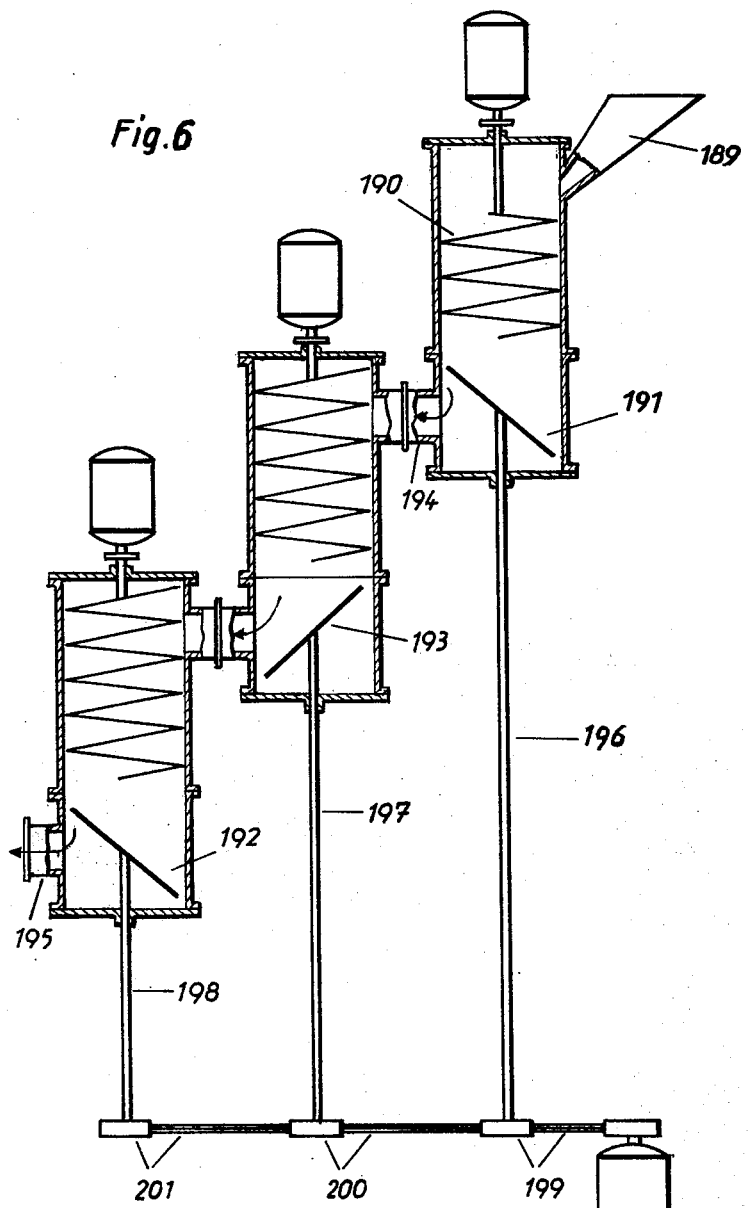

United States Patent Office 3,164,330
Patented Jan. 5, 1965

3,164,330
ROTARY-PUMP APPARATUS
Georg Neidl, Uferstrasse 5–6, Berlin N. 65, Germany
Filed Aug. 30, 1961, Ser. No. 134,964
Claims priority, application Germany, Sept. 6, 1960,
N 18,866; Oct. 21, 1960, N 19,066; Aug. 3, 1961,
N 20,408
9 Claims. (Cl. 241—186)

The present invention relates to improvements in apparatus incorporating rotary pumps of the type constituting the subject matter of my U.S. Patent No. 2,956,503, issued October 18, 1960, and my copending application Ser. No. 61,934, filed October 11, 1960, and now U.S. Patent No. 3,120,353.

The subject matter of my Patent No. 2,956,503 is a rotary pump in which variously shaped pump members rotate in a pump housing. Use is especially made of pumping discs fixed to the pump shaft. One object of the invention of this patent is the conveying or transport of normally difficult-to-handle materials, especially sewage, viscous materials, foods and refreshments, building material and the like. In conveying or pumping these materials it was found advantageous to shape the pump member, and to journal it in the pump housing, in such a manner that the feed is not only conveyed but also modified physically, e.g. fulled, kneaded, comminuted or the like, by contact with the pump member.

One improvement in, or modification of the subject matter of such rotary pumps, according to the present invention is the use of a screw conveyor to shift the feed to be conveyed and treated or prepared from a hopper to the rotary pump.

It should be noted that though the word "pump" is used in the present specification, this is only done for the sake of convenience, and in fact there is no exact term in machine construction and engineering for apparatus to be thus denoted. As already mentioned these new machines not only pump a feed but simultaneously prepare or treat it.

By using a feeding screw conveyor it is possible to convey thick materials, such as those containing 20–25% dry matter, which in practice do not flow of their own accord. Such a material, e.g. cellulose pulp, can be fed by the screw conveyor to the pump by which it is conveyed without any difficulty. Also peat and coal can be both homogenized and conveyed in this manner. This homogenization increases the calorific value of peat fivefold.

Plant material, kitchen waste, fruit and other organic substances contain so much liquid that they can be fed in without additional water. They are comminuted or pulped into a mass which may contain substantially less than 20% dry matter.

In order to adjust the speed of the screw conveyor to suit that of the rotary pump, use is made of a transmission, preferably of the steplessly variable type, between the screw conveyor and its drive motor. Under certain conditions it may be advisable to use such a transmission between the rotary-pump disk and its drive motor. The use of the stepless transmission interposed between the disk and the conveyor is advantageous since the various flow properties of viscous substances cannot be predicted by rheological theory. It is, therefore, an advantage to be able to vary the speeds of the pump and screw conveyor independently during operation, especially as the flow properties of viscous or thick materials depend on external conditions such as atmospheric pressure and humidity, solar radiation and the like.

It has been found advantageous to journal the rotor of the screw conveyor, in cantilever position, only at the end nearest to the rotary pump. In order to minimize back pressure losses it is convenient to dimension the sides or outer periphery of the screw-conveyor rotor in such a manner that it makes a running fit in its housing. The latter, therefore, acts as a type of journal for the screw rotor over a substantial portion of the length thereof.

The pump member of the rotary pump can be of any shape, for example, it can be in the form of a round or truly elliptical disc with smooth or possibly toothed periphery.

By providing circumferential grooves in the pump housing for these teeth to run in, an especially fine comminution takes place during pumping. This is due to the increased number of edges on the pump member, especially in view of the fact that, despite the comparatively narrow zone of engagement of the pump member in the grooves of the housing, it is ensured that the particles contained in the feed being pumped slide along the inwardly turned oblique faces and edges and are passed to the adjacent edges on which they are comminuted by impact and tearing effects, especially at high speeds of rotation.

This favorable effect can be still further enhanced by providing the inner face of the housing with transverse grooves or channels as well as circumferentially directed ones. This improves the comminuting action owing to the increase in the number of edges and counter edges.

In order to achieve complete freedom from lumps, it is possible to place a sieve in an outlet leading from the pump housing into a pressure duct.

The screw conveyor produces a certain pressure the feed inlet to the rotary pump. A greater increase in pressure in the rotary pump is then produced by the oblique pump disc whose strokes force the feed out through the outlet duct in the manner of a paddle or spade blade.

The feed funnel or hopper of the screw conveyor is supplied by a belt or bucket conveyor, or can be supplied from silos or bins manually or with a dredging device with the material allowed to drop into the funnel. It is also possible to use a screw conveyor to drop the feed material into the funnel. Care should be taken here to ensure that the intake rate of the screw conveyor and of the rotary pump is suited to the throughput rate of the conveyor. It may be an advantage to set the gears or the transmission so that the output rate of the screw conveyor exceeds the output rate of the rotary pump, and quasi-hyd "jamming" effects occur in the rotary pump with a consequent improvement in the comminution of the feed being prepared.

Details of the invention are now described with reference to the various embodiments of it shown in the attached drawings.

FIGURE 1 is a schematic elevational view of a rotary-pump apparatus incorporating a screw conveyor according to the invention.

FIGURE 2 is a section of the rotary pump on the II—II of FIGURE 1.

FIGURE 3 shows a horizontal tandem arrangement of three rotary-pump units.

FIGURE 4 shows a rotary pump, cooperating with a conveyor, with a special housing.

FIGURE 5 shows another rotary pump and conveyor with a grooved sleeve lining the housing.

FIGURE 6 shows a tandem arrangement similar to that shown in FIGURE 3 but vertically disposed.

FIGURE 7 is an explanatory diagram of a tandem arrangement of three rotary pumps connected by elbow ducts.

FIGURE 8 shows an embodiment in which the screw conveyor and its housing are generally conical.

The rotary-pump housing 148 has an internal pump disc 150 fixed obliquely on a first shaft 149 extending through and journaled in one end wall of the housing. The pump shaft is driven through a steplessly variable transmission 151 by an electric motor 152 (FIG. 1). A screw conveyor 153 is connected by a flange joint directly to the inlet side of the housing 148, the inlet bore being completely open, and agrees in cross section with, the bore of the screw conveyor. The feed or material to be treated is supplied by a conveyor belt 209 to the screw conveyor housing through a filling funnel 155 or hopper. The rotor 154 of the screw conveyor 153 is mounted cantilever fashion in a bearing 156 in the end plate or cover 157 of the screw conveyor housing and is driven through a steplessly variable transmission 158 by an electric motor 159. The second shaft of the conveyor extends through the other end wall of the housing.

From the filling funnel the material to be treated is passed by the screw conveyor rotor 154 into the housing of the rotary pump 148 whence it is pressed by the pump disc 150 into the pressure duct 160 (FIG. 2) leading from the pump.

As shown in FIG. 3 three rotary pumps 161, 162 and 163 with feed screw conveyors are arranged in units 167, 168 and 169 connected in tandem. The housing of the first screw conveyor rotor 164 is provided with a filling or charging funnel 170 perpendicular to the axis of this rotor and this rotor is driven by a motor 171. The first rotary pump 161 delivers into the housing of the second screw, or screw conveyor rotor 165 through a pressure duct or connection 172. The second rotary pump 162 delivers through a pressure duct 173 into the housing of the third screw 166. Finally the material after the three treatments passes out of the third rotary pump 163 through the pressure connection 174.

The individual pump discs 175, 176 and 177 are rotated via shafts 178, 179 and 180 whose outer ends have driving pulleys 181, 182 and 183 driven through belts 184, 185 and 186 attached to a belt pulley 187 of an electric motor 188.

The material to be treated is, owing to the tandem arrangement, treated successively in the individual pumps to which it is fed by the screw conveyors. The fineness of comminution increased from stage to stage. The use of feed screw conveyors is also desirable here on account of the viscosity or stiffness of the material to be handled or treated.

Instead of rotary pumps with cylindrical or slightly spiral pump housings, it is possible, as shown in FIG. 4, to use pumps with housings 117 of spherical or ellipsoidal form.

As shown in FIG. 5, it is possible to use a housing 45 for the rotary pump, which has a grooved bush or sleeve 36, which mates with the teeth of the pump member 24 mounted upon hub 43.

In order to make the pump more adaptable, it is also an advantage here to couple the drive motors with steplessly variable transmissions and to adapt the dimensions of the individual units in accordance with the specific volume of the meterial being handled, which changes during the course of the treatment by the individual units. Instead of altering the dimensions, it may, under certain conditions, be convenient to make the sizes of the machine units the same, but, in order to suit the varying specific volumes, to run the different units at different speeds.

In accordance with the arrangement of FIG. 6, the feed chute or hopper 189 on the housing of the first screw 190 is placed to the side and runs obliquely upwards.

A further modification of the tandem arrangements described herein, consists in replacing the parallel arrangement of the three oblique discs of the rotary pumps, by one in which only two oblique discs 191, and 192 are parallel to each other, while the third oblique disc 193 is placed in between the other two and is perpendicular to them. This set up is applicable to any number of pump machines placed in series in which the arrangement of the oblique discs to each other is so chosen that the first and third oblique discs are parallel as regards their faces and the second and fourth are perpendicular to the direction of the first and third and are therefore parallel to each other. This arrangement will have the effect that, in the position of the two outer oblique discs 191 and 192 shown, the latter lengthen the paths to outlet ducts 194 and 195, while, on the other hand, the oblique disc 193 or the central rotary pump finds itself in a feeding position in which the shortest path between the entry site of the material in the rotary pump and the outlet site is followed. On further rotation of the pump discs through an angle of 180°, the positions are such that the feed is compelled to make a deviation around the pump disc 193 while the two outer pump discs 191 and 192 are in the position in which the feed can take the shortest path through the pumps. This change is repeated in quick succession as the pumps are rotated, so that the treatment and feeding effects are enhanced.

In order to permit that this mutual setting of the three pump discs to be achieved exactly and safely during operation, it is necessary that the three pumps shafts 196, 197 and 198 should be positively connected together for driving so that belt drives have to be replaced by chain or toothed drives as indicated by the reference numbers 199, 200 and 201 in FIG. 6.

The vertical position of the individual machine units has the advantage, especially in large plants, that the driving system for the rotary pumps can be placed in the basement or cellar of the machine shop, while the pumping units can be placed in two upper floors of the building.

The mutual arrangement of the individual rotary pump apparatus according to FIGS. 3 and 6 has the advantage that straight ducts or unions are used to connect the units. In the tandem arrangement of rotary pumps, as shown in FIG. 7, this is not possible and it is necessary to use elbow unions 202 and 203, which have the disadvantage, when viscous or thick materials are used, that de-hydration and therefore possibly obstruction may take place in the extreme parts of the elbows with consequent jamming and agglutination of the thick material, thus if the plant is arranged for continuous operation, a considerable delay may occur since the elbow joints or ducts must be removed and cleaned out.

The novel apparatus is also specially suitable for the preparation of cellulose pulp, cellulose, waste paper, and rags and the like; especially in the case where it is necessary to produce a slurry free of lumps for the production of paper, cardboard and similar products. In this case a sieve insert is disposed in the outlet side of one or more of the rotary pumps in the pressure ducts or connections as was indicated in the main patent application, so that freedom from lumps is guaranteed. In the previous type of treatment carried out by means of pan grinders, refiners and the like, it was never possible to produce such a fine and even stuff or pulp. The treatment was also of longer duration.

In accordance with what has been explained in connection with FIGS. 1, 2, and 3 it is convenient to mount the screws of the screw conveyors so that they run with as little clearance as possible in their housing, so that the excess pressure at the outlet does not cause the feed, whether in paste, or slurry form, does not run back against the screwing effect of the screw conveyor through clearances between the sides of the screw conveyor rotor or screw and the screw conveyor housing.

It has been shown, that for the highest degree of homogenization, that is to say freedom from lumps the material being fed and treated, it is convenient to arrange the rotors 191, 192 and 193 of the apparatus of FIGURE 6 so as to be of generally elliptical configuration and to have the smallest possible play between them and the pump housings.

This is especially the case when the pump member has peripheral teeth engaging grooves in the corresponding housing.

It is usually most convenient to make the screws 204, as shown in FIGURE 8, in such a manner as to taper in the feed direction 205, that is to say in the direction towards the oblique rotor machine 206. Thus not only is the screw conveyor rotor or screw conical, but also the screw housing 207. This is done in such a manner that the screw runs in the housing with a small clearance. While the smallest diameter of the screw housing is about equal to the entry diameter of the machine housing of the oblique rotor, the greatest diameter of the screw is at the opposite end 208, that is to say at the entry site of the filling funnel (not shown).

I claim:

1. A system for displacing and mixing viscous fluent materials comprising a housing forming a generally cylindrical pump chamber; a disk journaled in said chamber for rotation about the axis thereof, said disk being inclined to said axis and having a periphery closely juxtaposed with the wall of said chamber; and a screw conveyor journaled in said housing for rotation about an axis codirectional with the axis of rotation of said disk for feeding said viscous material to said disk, said wall being provided with an outlet through which said material is displaced by said disk.

2. The system defined in claim 1, further comprising common drive means for said conveyor and said disk, said drive means including a stepless transmission interposed between said disk and said conveyor.

3. The system defined in claim 1 wherein said housing is provided with a pair of end walls, said disk being mounted upon a first shaft extending through one of said end walls into said chamber and journaled in said one of said end walls, said conveyor being cantilevered upon a second shaft extending through the other of said end walls in the direction of said disk, both of said shafts being rotatable about said axis.

4. The system defined in claim 3 wherein said housing is formed with a further wall closely surrounding and slidably engaging the periphery of said screw for supporting same.

5. The system defined in claim 1 wherein said disk is formed with a toothed periphery.

6. The system defined in claim 1, further comprising a second housing communicating with the first-mentioned housing via said outlet, said second housing forming another cylindrical pumping chamber wherein a disk is obliquely mounted for rotation about its axis and a screw conveyor is journaled for feeding material received from said first housing to the disk of said second housing.

7. The system defined in claim 6 wherein said disks are each rotatable about a substantially vertical axis and said second housing is connected with the first housing via a chute inclined to the vertical.

8. The system defined in claim 7 wherein said disks are jointly rotated and maintained in outer-face relationship by substantially 180°.

9. The system defined in claim 1 wherein said housing is conically convergent in the direction of said disk along said conveyor.

References Cited by the Examiner

UNITED STATES PATENTS

| 1,549,278 | 8/25 | Sundstrand | 82—2 |
|---|---|---|---|
| 1,564,483 | 12/25 | Kenyon | 82—2 |
| 2,029,766 | 2/36 | Durdin. | |
| 2,714,288 | 8/55 | Davis | 103—5 |
| 2,729,145 | 1/56 | Wandel | 241—45 |
| 2,729,146 | 1/56 | Wandel | 241—45 |
| 2,952,213 | 9/60 | Goettl | 103—103 |
| 2,956,503 | 10/60 | Neidl | 103—103 |

J. SPENCER OVERHOLSER, *Primary Examiner.*

ROBERT A. O'LEARY, *Examiner.*